June 16, 1953 T. H. PEIRCE 2,642,240
MOTOR MOUNTING
Filed May 28, 1947
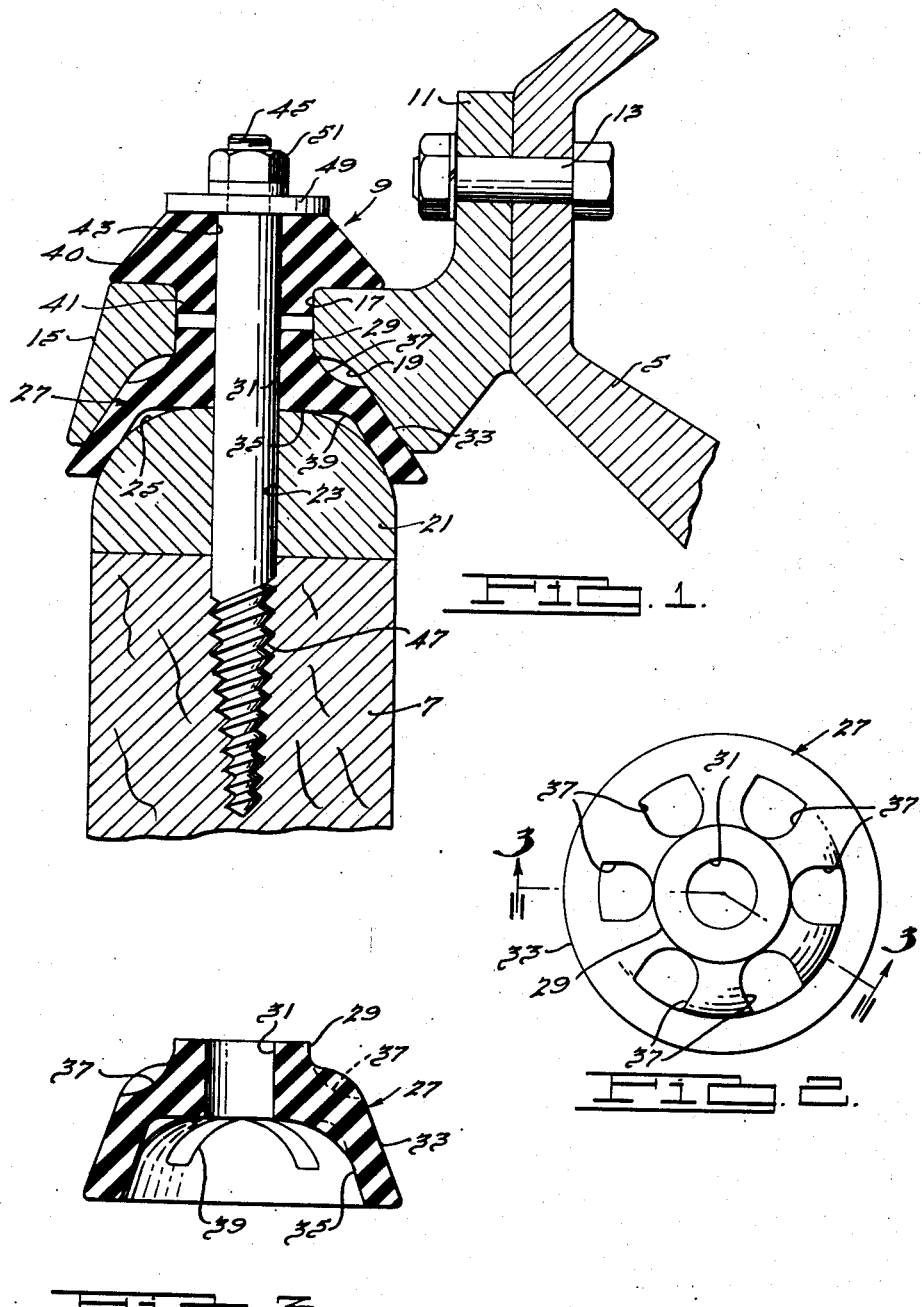
INVENTOR.
Thomas H. Peirce.
BY
Harness, Dickey & Pierce.
ATTORNEYS.

Patented June 16, 1953

2,642,240

UNITED STATES PATENT OFFICE 2,642,240

MOTOR MOUNTING

Thomas H. Peirce, Detroit, Mich., assignor to H. A. King, doing business as H. A. King Co., Detroit, Mich.

Application May 28, 1947, Serial No. 750,994

2 Claims. (Cl. 248—9)

This invention relates to resilient mountings adapted to be interposed between relatively movable members.

The principal objects of the invention are to provide an improved resilient mounting adapted to be interposed between two relatively movable members such as a vehicle engine and the body or frame of a vehicle, engine bed of a boat, or the like, so as to prevent, or at least minimize, the transmission of vibrations and torsional reactions between said engine and the part supporting it; to provide a resilient mounting of the aforementioned type in which the resilient portions thereof will be free to displace or flow under load in any direction so as to thereby obtain higher deflections or lower frequencies under operating loads or static loads; to provide a resilient mounting of the aforementioned type having upper and lower rigid members and resilient elements disposed between said rigid members and above the upper rigid member, so as to dampen vibrations transmitted in any direction from the supported member to the supporting member; to provide a resilient mounting of the aforementioned type in which high deflections and low frequencies, under operating loads or static loads, can be obtained without placing any undue stress on any one portion of any of the resilient elements, and thereby produce a more uniform rate of deflection for the mounting.

These and other objects of this invention will become more apparent from the following description taken in conjunction with the accompanying drawing in which:

Fig. 1 is a vertical sectional view of the resilient mounting of this invention interposed between two relatively movable members;

Fig. 2 is a top plan view of the resilient element disposed between the upper and lower relatively rigid members of the mounting; and Fig. 3 is a sectional view of the structure illustrated in Fig. 2 taken along the line 3—3 thereof.

Referring now to the drawing, it will be seen that a support leg 5 of an engine, such as a marine engine, is supported on a supporting member, such as a conventional boat engine bed member or stringer 7, by means of the resilient mountings, generally indicated at 9, of this invention. However, it will be appreciated that the resilient mounting 9 of this invention is not limited to use on boats but may be used for supporting an engine in suitable vehicles, such as a truck or car, or in any other useful capacity.

The resilient mounting 9 includes a relatively rigid bracket member 11, made preferably of metal, which is secured to the engine support leg 5 by means of one or more bolts 13. The bracket 11 is formed with an outwardly extending horizontal flange or portion 15, which has a central opening 17 therethrough. A recess 19 of a generally frustro-conical conformation is provided in the underside of the horizontal portion 15 of the bracket 11. Disposed below the bracket recess 19, is a relatively rigid block 21, made of wood, metal, or the like, which rests upon the upper surface of the stringer 7, or its equivalent, and which has a central aperture 23 therethrough which is in axial alignment with the central opening 17 of the bracket 11. The upper surface 25 of the block 21 is formed so as to be generally complemental to the recess 19 in the bracket 11, and is disposed in vertical spaced relation thereto.

Disposed between the block 21 and the bracket 11 is a resilient washer-like member 27 which has a neck portion 29 formed on the upper end thereof, which is closely received in the lower end of the bracket central opening 17. A central opening 31 is provided in the resilient washer 27, which is in axial alignment with the aperture 23 in the block 21. The outer periphery 33 of the resilient washer 27 is of a generally frustro-conical shape so as to be received within the bracket recess 19, with at least a portion thereof engaging the wall of the recess 19.

The underside of the resilient washer 27 is formed with a frustro-conical shaped recess 35 in which is received the upper end of the block 21, so that at least a portion of the upper surface 25 of the block engages a portion of the side walls and upper wall of the recess 35.

Spaces are provided between the resilient washer 27, and the bracket 11 and block 21, into which the resilient material of the washer 27 may flow when subjected to vertical loads. These spaces may be obtained by recessing either the metal members 11 and 21, or the washer 27. The latter is preferable from a standpoint of economy and manufacture and is so illustrated in the drawing. The recessing of the resilient washer 27 is accomplished by providing a plurality of circumferentially spaced notches 37 in the outer periphery of the washer 27, adjacent the upper end thereof, and by providing a plurality of circumferentially spaced notches 39, at substantially the junction of the side walls and the upper wall of the washer recess 35.

It will be noted that the extreme lower end of the resilient washer 27, while abutting the upper surface of the block 21 is vertically unconfined, so that the resilient washer is free to flow in any direction when operating or static loads are applied thereto. It will be noted that the frustro-conical surfaces of the bracket recess 19, and resilient washer 27 are curved inwardly and flattened at their top, and are therefore subject to direct compression under load. The notches 37 and 39 therefore provide spaces for the material of the resilient washer to flow so as to reduce the rate of build-up of the upper portion of the washer 27, which is otherwise confined between the rigid members, and thus provide a mounting of softer action. The size, number, and spacing of the notches 37 and 39 control the action of the resilient washer. Likewise, this construction permits higher deflections or lower frequencies to be obtained under vertical loads and likewise eliminates a rapid built up rate of deflection under shock load so as to eliminate any undue stress on any one portion of the resilient washer 27.

A second resilient washer 40 is disposed above the horizontal portion 15 of the bracket 11, and is of a generally frustro-conical shape. The washer 40 has a downwardly depending neck portion 41 formed on the underside thereof which is closely received within the upper end of the bracket central opening 17 so that the base of the washer 40 abuts the upper surface of the bracket horizontal portion 15. The neck portions 29 and 41 of the washers 27 and 40 respectively, maintain the bracket 11 and the block 21 against any material lateral movement and therefore provide lateral resilient stability for the mounting.

The resilient washer 40 is provided with a central aperture 43, which is axially aligned with the central aperture 31 of the washer 27. A screw 45, here shown as a lag screw for cooperation with the wooden stringer 7, is closely received in the central apertures of both the resilient washers 40 and 27 and in the aligned aperture 23 of the block 21. The lower end of the lag screw 45 is threadably received, at 47, in the boat stringer 7, and a washer 49 is received on the upper end of the lag screw 45, which abuts against the upper surface of the resilient washer 40. A lock nut 51 is threaded on the upper end of the lag screw and is adapted to be threaded down against the washer 49 and thereby secure the bracket 11 and block 21 in position with respect to the stringer 7, and also preload both the resilient washers 27 and 40 a predetermined amount, as required for snubbing. The upper resilient washer 40 therefore acts as a rebound bumper for the mounting.

It will thus be seen that a resilient mounting is provided which is adapted to be interposed between two relatively movable parts to effectively dampen vibration therebetween, irrespective of the direction of movement of the supported member with respect to the supporting member.

I claim:

1. In an engine mounting or the like, the combination of an L-shaped mounting bracket having its upright leg adapted for connection to an engine to receive the vertical gravity load therefrom, the transverse leg of said bracket having an aperture therethrough the axis of which is transversely spaced from the upright leg, the upper surface of said transverse leg surrounding said aperture being normal to the axis of the aperture, said transverse leg having a recess formed therein about the axis of said aperture that provides a downwardly facing frusto-conical surface, a fixed gravity load receiving member beneath the transverse leg of said bracket having an upwardly facing frusto-conical surface coaxial with but spaced beneath the frusto-conical surface of the leg, an annular rubber body having a frusto-conical skirt between and engaging said frusto-conical surfaces whereby gravity load from the bracket is transmitted to the member, said skirt having circumferentially spaced recesses formed in the opposite surfaces thereof, said rubber body having a neck extending upwardly from the skirt and fitted in said aperture, another annular rubber body engaging the upper surface of said transverse leg and having a neck extending downwardly and fitted in said aperture, and a bolt shouldering on the top surface of said last rubber body and extending through said aperture and threading into said member whereby axial compression may be applied to said bodies.

2. The invention of claim 1 wherein said circumferentially spaced recesses extend into the junctures of the inner and outer annular surfaces of the neck with the surfaces of the skirt.

THOMAS H. PEIRCE.

References Cited in the file of this patent

UNITED STATES PATENTS

| Number | Name | Date |
| --- | --- | --- |
| 1,725,523 | Keys | Aug. 20, 1929 |
| 1,859,777 | Keys | May 24, 1932 |
| 1,892,065 | Markey | Dec. 28, 1932 |
| 2,037,033 | Lord | Apr. 14, 1936 |
| 2,076,046 | Schjolin | Apr. 6, 1937 |
| 2,115,458 | Geyer | Apr. 26, 1938 |
| 2,215,743 | Saurer | Sept. 24, 1940 |

FOREIGN PATENTS

| Number | Country | Date |
| --- | --- | --- |
| 679,384 | Germany | Aug. 4, 1939 |
| 887,567 | France | Aug. 16, 1943 |